United States Patent
Fineberg et al.

(10) Patent No.: US 11,163,504 B2
(45) Date of Patent: Nov. 2, 2021

(54) DIVIDING A SPANNING REGION OF ADJACENT SUB-IMAGES TO GENERATE PRINT DATA

(71) Applicant: HP Indigo B.V., Amstelveen (NL)

(72) Inventors: Zelidor Fineberg, Ness Ziona (IL); Eli Velner, Ness Ziona (IL); Noam Shaham, Ness Ziona (IL); Oren Haik, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 17/062,062

(22) Filed: Oct. 2, 2020

(65) Prior Publication Data

US 2021/0019096 A1    Jan. 21, 2021

Related U.S. Application Data

(63) Continuation of application No. 16/464,700, filed as application No. PCT/EP2017/053254 on Feb. 14, 2017, now Pat. No. 10,802,770.

(51) Int. Cl.
  *G06F 3/12* (2006.01)
(52) U.S. Cl.
  CPC ............ *G06F 3/1208* (2013.01); *G06F 3/125* (2013.01); *G06F 3/1253* (2013.01)
(58) Field of Classification Search
  CPC .................................................. G06F 3/1208
  USPC ......................................................... 358/1.6
  See application file for complete search history.

(56) References Cited

U.S. PATENT DOCUMENTS

| 6,690,837 B1 ‡ | 2/2004 | Broddin | H04N 1/3876 382/254 |
| 7,006,111 B1 | 2/2006 | Rothrock | |
| 7,163,287 B2 ‡ | 1/2007 | Silverbrook | B41J 2/14427 347/10 |
| 7,388,686 B2 ‡ | 6/2008 | Saquib | B41J 2/355 358/1 |
| 8,937,702 B2 ‡ | 1/2015 | Rimai | H04N 1/3876 352/69 |
| 2004/0068698 A1 * | 4/2004 | Wu | G06F 40/143 715/251 |

(Continued)

FOREIGN PATENT DOCUMENTS

| GB | 2102737 | ‡ | 2/1983 |
| WO | WO-9613825 | ‡ | 5/1996 |
| WO | WO-2016118682 | | 7/2016 |

OTHER PUBLICATIONS

Bian, C et al., Stitching Line and Deformation Propagation for Seamless Image Stitching, Nov. 26-28, 2012, < http://dl.acm.org/citation.cfm?id=2425889 >.‡

(Continued)

*Primary Examiner* — Jacky X Zheng
(74) *Attorney, Agent, or Firm* — Trop Pruner & Hu PC (57) ABSTRACT

In some examples, a system selects a spanning region of an image spanning an intersection between adjacent sub-images that partition the image. The spanning region is divided based on a non-linear path that is determined on the basis of a user input, resulting in respective modified adjacent sub-images. Print data to cause a printing device to print the respective modified adjacent sub-images is generated on the basis of the dividing.

20 Claims, 7 Drawing Sheets

(56) References Cited

U.S. PATENT DOCUMENTS

| | | | | |
|---|---|---|---|---|
| 2012/0268792 | A1‡ | 10/2012 | Ozaki | G06F 3/1252 358/1.18 |
| 2013/0028648 | A1‡ | 1/2013 | Dufort | G06F 3/1264 400/62 |
| 2016/0309082 | A1 | 10/2016 | Maayan et al. | |

OTHER PUBLICATIONS

Bian, C et al., Stitching Line and Deformation Propagation for Seamless Image Stitching, Nov. 26-28, 2012, < http://dl.acm.org/citation.cfm?id=2425889 > (6 pages).

\* cited by examiner
‡ imported from a related application

DIVIDING A SPANNING REGION OF ADJACENT SUB-IMAGES TO GENERATE PRINT DATA

CROSS REFERENCE TO RELATED APPLICATIONS

This is a continuation of U.S. application Ser. No. 16/464,700, having a national entry date of May 29, 2019, U.S. Pat. No. 10,802,770, which is a national stage application under 35 U.S.C. § 371 of PCT/EP2017/053254, filed Feb. 14, 2017, which are both hereby incorporated by reference in their entirety.

BACKGROUND

Printing devices print images on a media according to image data. Printing devices can print images that exceed the printable dimensions of the printing device by printing two or more sub-images that form the complete image. For example, prints of wallpapers, large commercial banners and panoramic photos can be printed by generating image data for two or more sub-images and printing each sub-image.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Certain examples described herein provide methods and systems for generating printed images of images that are unprintable on a single print of a printing device. For example, prints of wallpapers, large commercial banners and wide panoramic photos may be too large to print on a single sheet. One option for printing oversized images is to print sub-images that comprise part of the large image and which can be stitched together to produce a print of the large image.

A convenient way of generating the sub-images is to take a digital representation of the complete image and use image processing techniques to divide the image into overlapping sub-images. For example, image processors can be used to select regions of the large image to make a plurality of sub-images which are printable on the printing device. Unfortunately, creating overlapping regions between sub-images has a number of side effects. These side effects may be more or less visible in the final printed output of the large image, depending on the paper handling accuracies of the printing device that is used to print the sub-images. For example, if the overlapping regions between the sub-images are too large, then the stitching areas between sub-images may become visible in the printed output. Alternatively, if the overlapping regions are too small, the stitching lines may still be visible as narrow strips between sub-images. A deviation as small as ±100 µm can make the stitching between the sub-images identifiable to the human eye. Moreover, the shape of the stitching used does not improve the situation. For example, even when using a jagged or a wavy stitching in the overlapping regions between sub-images instead of a straight line, the stitching is still distinguishable to the human eye in the final printed output. One of the reasons for this is that a naive stitching line between sub-images, which divides features in the larger image, results in easily identifiable lines between the printed sub-images on the printed output.

In certain examples herein, a method of stitching sub-images based on attributes of features in the image itself is described. The method is resilient to paper handling inconsistencies of the printing device. Furthermore, the resulting output print of the large image does not contain easily identifiable stitching lines in the overlapping regions between sub-images. Using image processing techniques, a path is determined in the overlapping regions between sub-images, such that the elements with the lowest possibility of being detected from visual inspection of the printed image, are selected. In particular, the methods and systems disclosed herein select those elements of the image which effectively trick the human eye's "pattern recognition" abilities when inspecting the image. The image processing apparatus described herein may use one or more image processing techniques to identify the particular elements in the image that result in improved stitching between adjacent sub-images. For example, in one case the apparatus identifies elements of image data corresponding to the image, where image attributes (color, lighting etc) are dissimilar. In some examples, the path dividing the sub-images passes across the line where there is increased difference between the sub-images in terms of these image attributes. The resulting line is less visible to the human eye than, say, a line which divides two regions of an image where there is greater similarity between image attributes.

Figure 1:
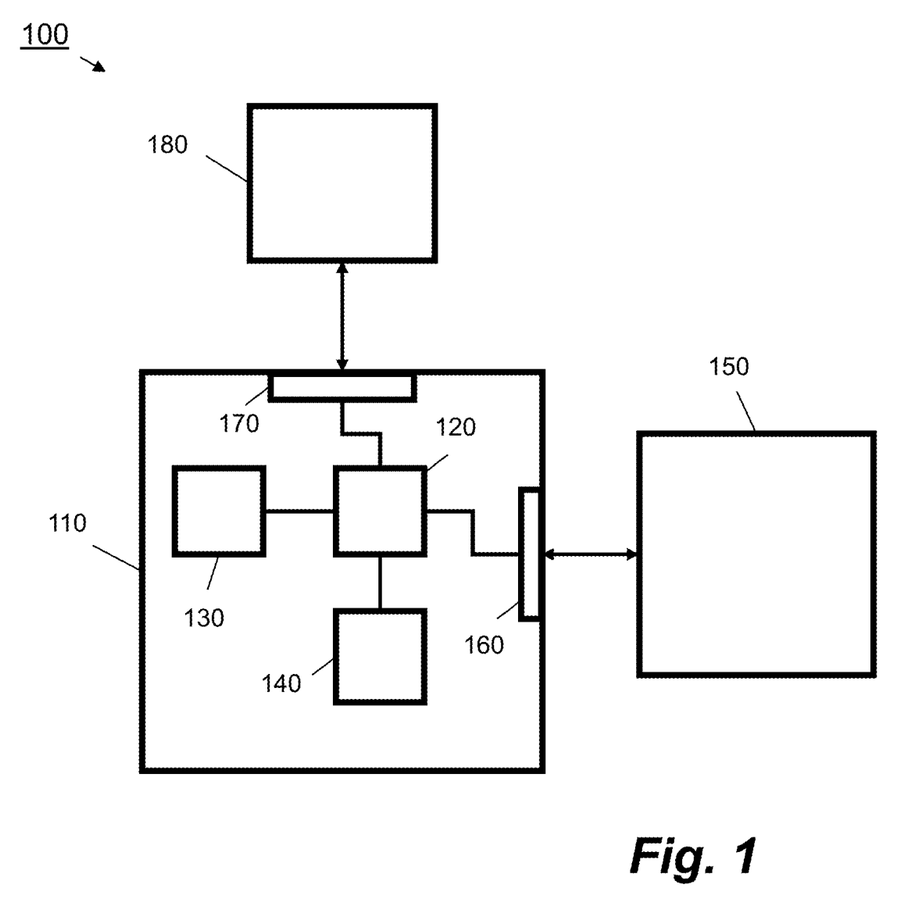
FIG. 1 is a schematic diagram showing an apparatus for generating print data according to an example.

FIG. 1 is a simplified schematic diagram of an apparatus 100 according to an example. Certain examples described herein may be implemented within the context of the apparatus 100. The apparatus 100 comprises an image processor 110. The image processor 110 shown in FIG. 1 comprises a central processing unit (CPU) 120, a graphic processing unit (GPU) 130 and a memory 140. The CPU 120 is arranged to process data such as image data. In the present disclosure, "image data" may comprise any digital representation of an image i.e. a numerical representation of a two-dimensional image, for example as pixels. A "sub-image" of an image comprises at least part of the image. Similarly "sub-image data" may comprise a subset of image data corresponding to a sub-image.

The apparatus 100 shown in FIG. 1 is arranged to generate print data according to examples described herein. The image processor 110 is shown communicatively coupled to a printing device 150. Herein, "print data" comprises any data operable to cause the printing device 150 to print an image, for example, instructions to cause the printing device 150 to deposit printing fluid at locations on a substrate to produce a printed output. In the apparatus 100 shown in FIG. 1, either the image processor 110 or the printing device 150 may be arranged to generate print data on the basis of image data. For example, the CPU 120 of the image processor 110 may generate print data that may be sent to the printing device via an interface 160. Alternatively, a print controller (not shown in FIG. 1) in the printing device 150 may generate print data from image data that is received from the image processor 110.

In FIG. 1, the CPU 120 is communicatively coupled to the memory 140. The memory 140 may be any volatile or non-volatile memory arranged to store data and may be read-only or readable and writable memory. The CPU 120 is communicatively coupled to the GPU 130. The GPU 130 is a special purpose processing unit arranged to send and receive data from the CPU 120. According to an example, the GPU 130 may receive image data from the CPU 120 and render graphics that can be displayed on a graphics display. The GPU can also perform general purpose and print related image processing tasks that are not limited to rendering graphics on the display. The image processor 110 further comprises an interface 170 which allows one or more graphics displays to be communicatively coupled to the image processor 110 and allow a user to interact with the image processor 110.

In the example shown in FIG. 1, the apparatus 100 comprises a graphics display 180 which is coupled to the image processor 110 via the interface 170. The graphics display 180 is arranged to display a graphical user interface (GUI) to a user with which the user can interact with the image processor 110 through manipulation of one or more graphical elements on the graphical display 180. Data and instructions are sent to the CPU 120 of the image processor 110 via the interface 170 that couples the graphics display 180 to the image processor 110. The graphical display 180 may be, for example, a display on a personal computer such as a desktop computer or a tablet. The image processor 110 may be located in the device (not shown in FIG. 1) that houses the graphics display 180. Alternatively, the graphics display 180 and image processor 110 may be located remotely from one another on separate devices. In such a case, the interface 170 may be a network interface arranged to couple a device comprising the image processor 110 to a network. The device may be arranged to connect via the network to a device with the graphics display 180 and to send and receive data via the interface 170.

The apparatus 100 further comprises the printing device 150 which is coupled to the image processor 110 via the interface 160. The printing device 150 is arranged to receive image data and/or print data from the image processor 110. The printing device 150 can generate a printed output on a substrate, when instructed to do so by a print controller, according to print data.

According to examples described herein, the printing device 150 is limited to generate printed outputs according to certain printing parameters that are specified by print configuration data of the printing device 150. For example, the printing device 150 may be able to generate printed outputs that are limited in one or more dimensions such as length or width, e.g. up to a maximum size of 1 m×0.5 m. Herein, an image defined by image data is said to be "printable" by the printing device 150 if print data can be sent to the printing device such that the printing device 150 can generate a printed output according to the print data. Otherwise the image is said to be "unprintable".

In certain examples of the apparatus 100 described herein, the image processor 110 is arranged to generate printable sub-images of an unprintable image. In particular, the image processor 110 is arranged to generate printable sub-images where the resulting output from the print device is such that that the individual printed sub-images are less distinguishable in the composite image that makes up the original (unprintable) image in the final printed output.

In FIG. 1, the apparatus 100 is configured to process image data of an image that is unprintable on the printing device 150, as will now be described.

According to a first example, the apparatus 100 may be arranged to receive image data from a device external to the apparatus 100. Alternatively, the CPU 120 of the image processor 110 may access image data stored in the memory 140.

Once the image data is accessed, the image is partitioned into sub-images. Herein a "partition" of the image into sub-images is a division of the image into a number of individual sub-images that together comprise the image. In one example, the image processor 110 is configured to generate a partition of the image into at least two adjacent sub-images. The at least two adjacent sub-images are chosen with intersecting regions, and may or may not themselves be printable on the printing device 150. In another example, the image data is sent to the GPU 130 which renders graphics corresponding to the image on the graphics display 180. A user viewing the image displayed on graphics display 180 selects at least two adjacent sub-images of the image to generate a partition using the GUI. In another example, the apparatus 100 receives the image data corresponding to the image and a pre-defined partitioning of the image into at least two adjacent sub-images.

The partitioning may be performed in such a way to ensure the resulting at least two adjacent sub-images are printable on the printing device 150. In one case, a user can check whether a partitioning of the image into at least two adjacent sub-images is such that the sub-images are printable by checking the sub-images of the image conform to the print parameters of the printing device 150. Alternatively, the image processor 110 may be arranged to receive the print configuration data from the printing device 150 and determine whether the at least two adjacent sub-images are printable on the printing device 150.

The apparatus 100 is configured to select a region spanning an intersection between the at least two adjacent sub-images partitioning the image. According to a first example, the CPU 120 of the image processor 110 identifies the spanning region in the intersection of the at least two adjacent sub-images of the image from image data. Alternatively, as with the initial partitioning of the image, a user that is able to view the image on the GUI on the graphics display 180 may be able to select a region spanning the intersection between the at least two adjacent sub-images.

Once a spanning region has been identified, the image processor 110 is arranged to receive user input e.g. from the GUI, that defines an area within the spanning region. The user input may be generated from a user selecting a sub-region in the spanning region displayed on the GUI of the graphics display 130. Additionally, the area may be defined in the spanning region according to one or more rules. For example, a rule may be implemented that prompts the user not to select an area in a region of the spanning region comprising a large block of one color or repeating pattern in the image. Implementing rules to restrict the area can result in a printed image without visually identifiable boundaries between printed sub-images.

The image processor 110 determines a non-linear path from one side to another side of the area that is defined by the user input. The image processor 110 is configured to divide the spanning region between the at least two adjacent sub-images based on the non-linear path. This results in at least two modified adjacent sub-images, each of which is printable on the printing device 150. The non-linear path defined in the area splits the spanning region into pieces, where the pieces replace the overlapping regions of the previously defined sub-images. This generates at least two modified adjacent sub-images.

According to an example, the image processor 110 may be configured to determine the non-linear path using one or more image processing techniques. In particular, in certain examples, the image processor 110 may be arranged to identify one or more elements of image associated with the spanning region and having one or more pre-determined image attributes. The image processor is configured to determine the path based on the one or more pre-determined image attributes.

In the present disclosure, "elements" of the image may comprise individual pixels or collections of pixels forming parts of the visual representation of the image. An image element may be a physical feature of the image, or may be a region of a particular color (such as blue sky, desert etc). In one example, elements of the image having one or more pre-determined image attributes comprise elements of the image having one or more pre-determined attributes in common with each other. In another example, the elements having one or more pre-determined image attributes comprise those elements in the image having one or more dissimilar or contrasting image attributes. The pre-determined image attributes may comprise one or more of: color, grey scale, texture and lighting. In particular, the non-linear path may be determined by the image processor to identify elements in the image on the basis of these image attributes, such that the boundaries between the sub-images in resulting print-outs are invisible (or close to invisible) by visual inspection in the image.

The apparatus 100 is configured to generate at least first and second print data, operable to cause the printing device 150 to print at least first and second prints, respectively, on the basis of the dividing of the adjacent sub-images by the non-linear path. As noted previously, the image processor 110 may be arranged to generate the print data from the image data, subsequent to the dividing of the spanning region between the at least two adjacent sub-images. In an example, the image data resulting from the dividing of the image into at least two modified adjacent sub-images, based on the non-linear path, may be sent to the printing device 150 that is arranged to generate print data based on the received image data e.g. at a print controller (not shown in FIG. 1).

Similarly to the at least two adjacent sub-images defined by the partitioning of the image, the image processor 110, or alternatively the user, can determine if the modified adjacent sub-images, which result from dividing the spanning region between the adjacent sub-images, are printable on the printing device. In the case that the modified adjacent sub-images are not printable, a new partitioning comprising printable adjacent sub-images or such that the resulting modified sub-images are printable can be determined.

Figure 2A:
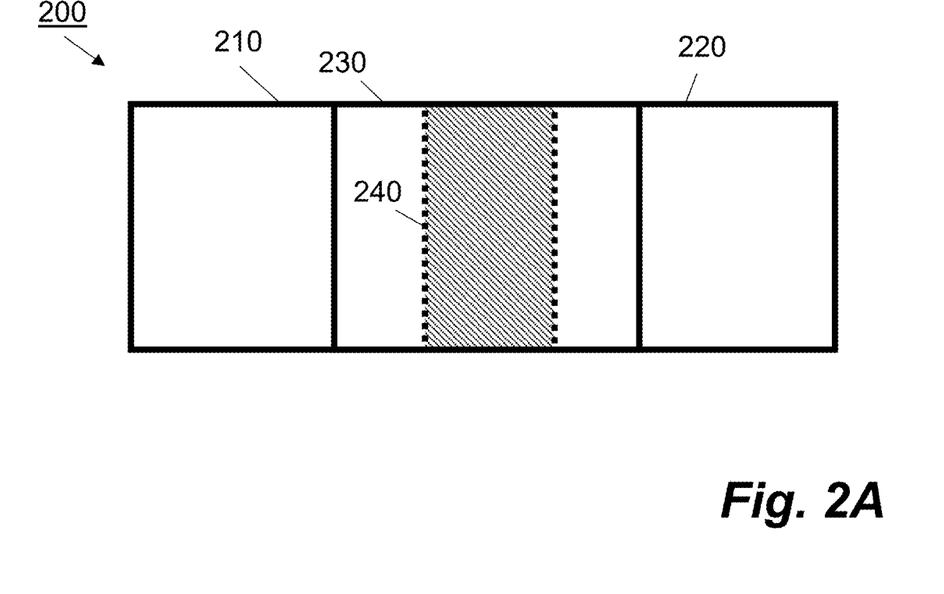
FIG. 2A is a schematic diagram showing adjacent sub-images according to an example.

FIG. 2A is a simplified schematic diagram of an image 200 according to an example. The image 200 may be displayed to a user on the graphics display 180 in FIG. 1. In the example shown in FIG. 2A, the image 200 is unprintable because the image 200 is too long to print on a single print of the printing device 150. In FIG. 2A, two adjacent sub-images 210, 220, that partition the image 200, are identified (in FIG. 2A, the dotted lines represent the area of the spanning region and the continuous lines represent the edges of the sub-images). The adjacent sub-images may be identified by e.g. a user of the graphics display 180 who selects the sub-images or, alternatively, by the image processor 110 automatically selecting adjacent sub-images of the image 200. The two adjacent sub-images 210, 220 of the image 200 overlap in the intersection 230. A region 240, that spans the intersection between the two adjacent sub-images, is determined. This region may be selected by the user or by the image processor 110. In another example, the sub-images may be determined by partitioning the large image 200 into equal slices, then identifying an overlapping region in the middle of the partitioned image, which forms the spanning region of the two sub-images 210, 220. In other words, the outer-most partitions of each of the two sub-images 210, 220 are identical and form the spanning region 240.

Figure 2B:
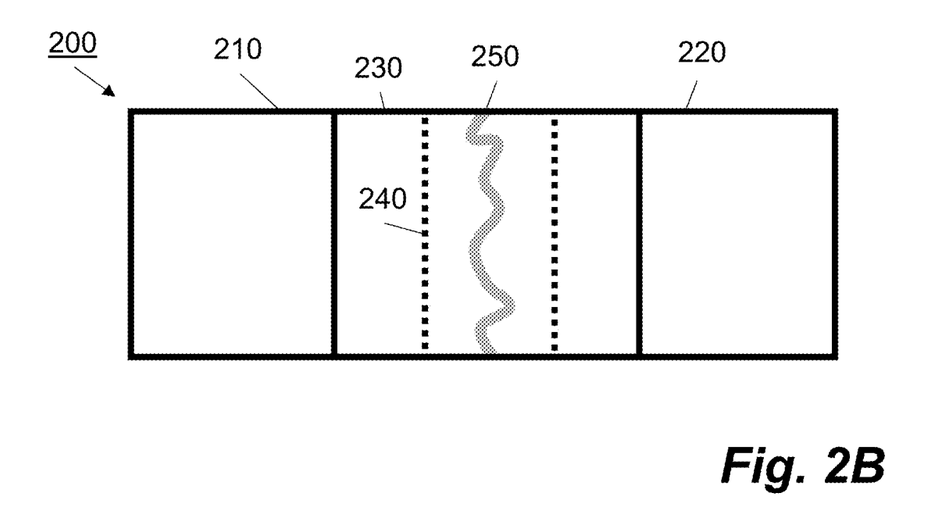
FIG. 2B is a schematic diagram showing an area between adjacent sub-images according to an example.

FIG. 2B is a schematic diagram of the image 200 shown in FIG. 2A. The spanning region 240 between the two adjacent sub-images is shown in FIG. 2B. Additionally, in FIG. 2B an area 250 in the spanning region 240 is shown. The area 250 is a user-defined area determined from a user input. In one case, the area is identified by a user accessing the image processor 110 via a GUI displayed on the graphics display 180 shown in FIG. 1. The user may select (e.g. with a touchscreen or mouse) the area 250 by drawing on the image in the spanning region such that the resulting area is a visual representation on the GUI.

In another example, the area 250 is chosen on the basis of a user input, rather than directly by the user interacting with the image processor 110 through a GUI. For example, a user may select, on a separate device displaying the image 200, an area which is then communicated to a device e.g. over a network. The area is chosen by the user in such a way as to identify elements in the spanning region such that the expected printed outputs of each of the resulting modified adjacent sub-images, produces a printed output of the image 200 without easily visible, easily identifiable stitches between adjacent sub-images.

Figure 2C:
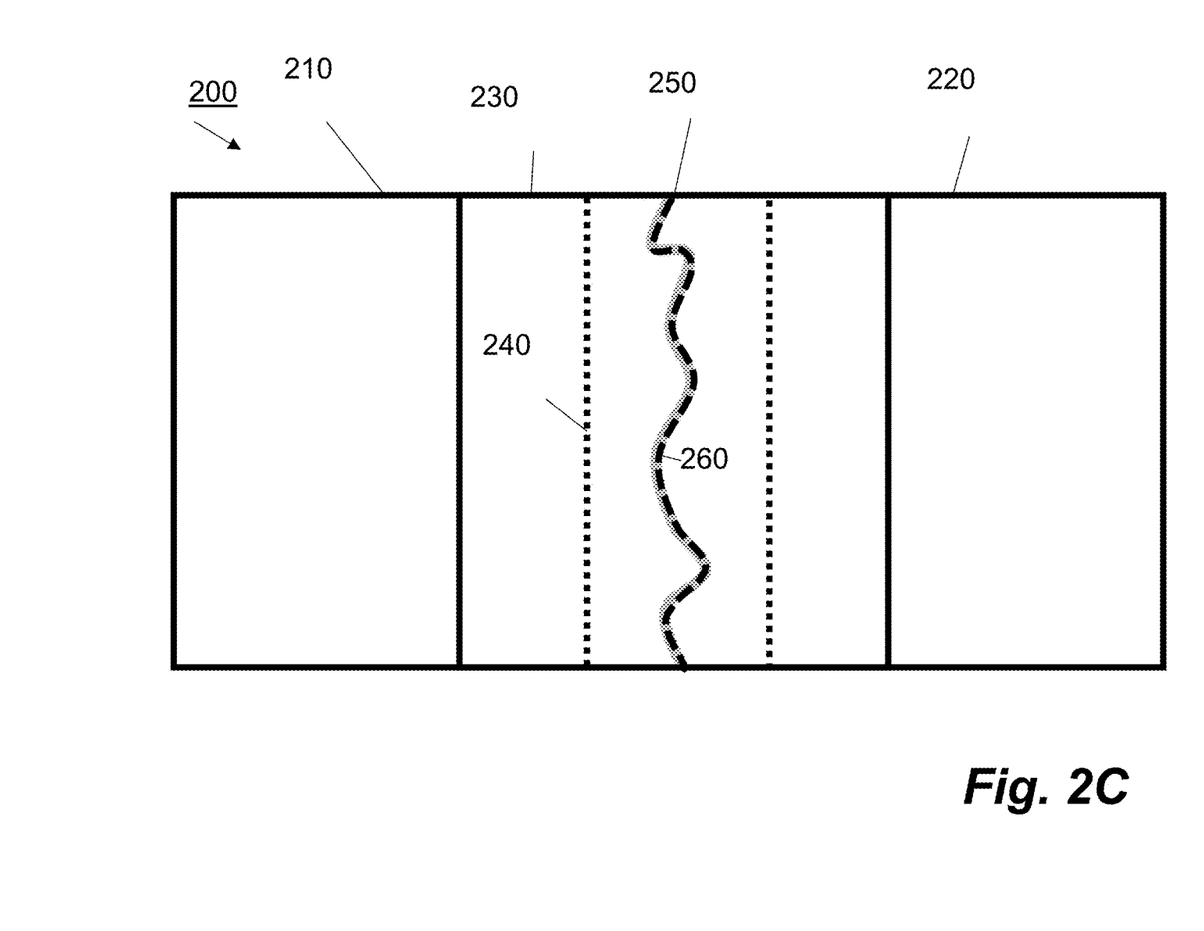
FIG. 2C is a schematic diagram showing a non-linear path between adjacent sub-images according to an example.
Figures 2D, 3:
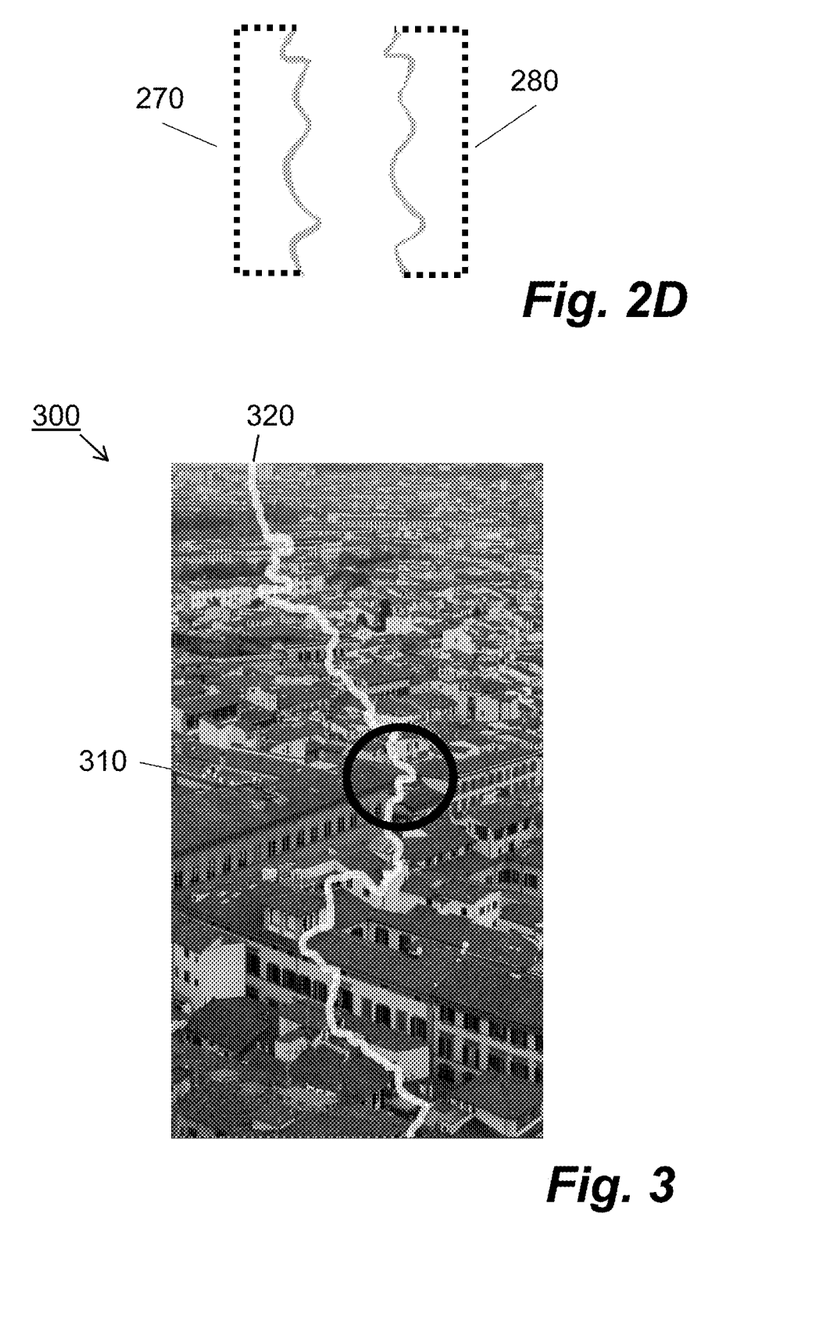
FIG. 2D is a schematic diagram showing two pieces of a spanning region according to an example.
FIG. 3 is a schematic diagram showing a spanning region according to an example.

FIG. 2C is a schematic diagram of the image 200 shown in FIGS. 2A and 2B. In FIG. 2C, the spanning region 240 between the two adjacent sub-images and the area 250 defined by the user input is shown. Additionally, a non-linear path 260 is shown. The non-linear path 260 traverses the image 200 from one side to another side of the area 250 and divides the spanning region between the two adjacent sub-images 210, 220 into two pieces. FIG. 2D shows the two separate pieces 270, 280 of the spanning region after it has been divided.

The two pieces are combined with the remaining sub-image data corresponding to each of the two sub-images, resulting in two modified adjacent sub-images that are printable on the printing device 150 shown in FIG. 1. As described in relation to FIG. 1, the image processor may determine if the resulting modified adjacent sub-images are printable from print configuration data of the printing device

150. If this is not the case, the image 200 can be re-partitioned and the process can be repeated.

FIG. 3 shows an image 300 according to an example. The image 300 shown in FIG. 3 is representative of a spanning region such as the spanning region 240 shown in FIG. 2A-2C. In particular, the image 300 corresponds to a spanning region 310 in an intersection between two adjacent sub-images that form part of a larger image (not shown in FIG. 3). The larger image is unprintable on a printing device such as printing device 150 shown in FIG. 1. In FIG. 3, a non-linear path 320 that divides the spanning region 310 is identified. In the example shown in FIG. 3, the non-linear path 320 has been determined on the basis of one or more image attributes. In particular, the non-linear path has been chosen to make the divide as unnoticeable as possible to the human eye when the larger image is reconstructed following printing of respective sub-images. For example, near the center of the image (encircled in FIG. 3) the non-linear path is determined by the image processor 110 based on dissimilar image attributes, including for example the difference in color around a building in the image 300. In the photo shown in the image 300, the path is determined such that it cuts between buildings in the photo, as opposed to cutting through the buildings which would result in a more easily noticeable cut between the adjacent sub-images.

Figure 4:
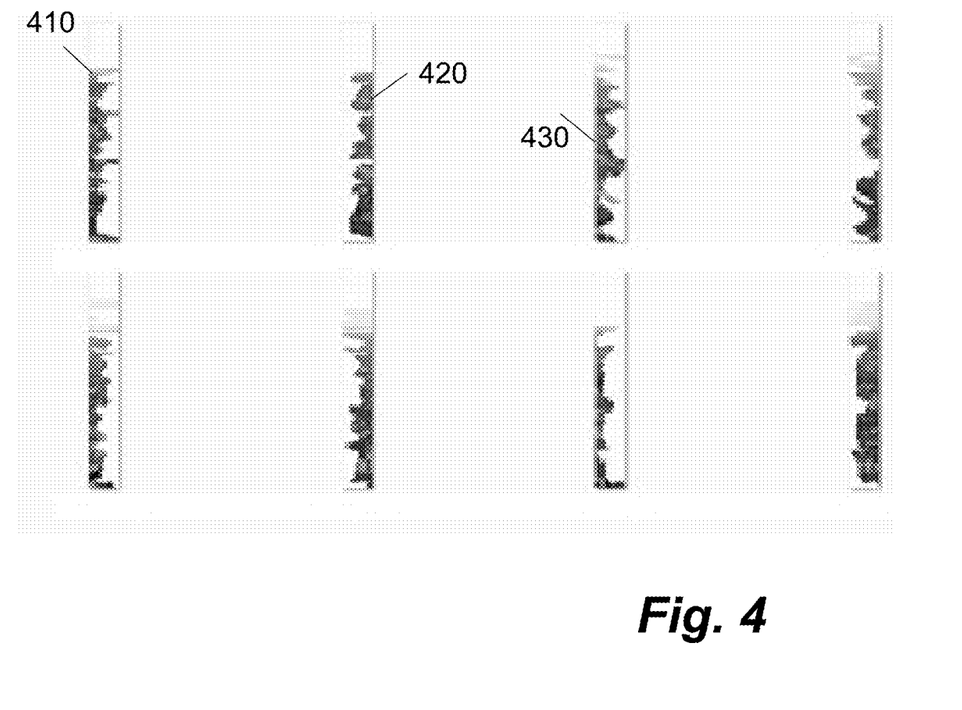
FIG. 4 is a diagram showing eight pieces of an image according to an example.

FIG. 4 shows eight pieces of an image according to an example. In FIG. 4, eight pieces corresponding to four distinct spanning regions are shown. Each piece corresponds to either a left or right-most piece of a sub-image that results from the divide of a spanning region between two adjacent sub-images of a larger image, along a non-linear path determined by the image processor 110. It can be seen from FIG. 4 that, for example, the pieces 410 and 420 correspond to right and left-most pieces, respectively of two modified adjacent sub-images and that the piece 430 corresponds to the right-most piece of the sub-image with corresponding left-most piece 420.

As with the image 300 shown in FIG. 3, the pieces 410 and 420 are determined by a non-linear path in a spanning region between adjacent sub-images such that the non-linear path has been chosen to make the divide as unnoticeable as possible to visual inspection, when the larger image is reconstructed following printing of the sub-images. According to an example, the pieces of the spanning regions may be rendered using the GPU 130. The sub-images and pieces of the spanning regions may be displayed to a user viewing images on the graphics display 180 and/or stored as image data in the memory 140 of the image processor 110. In one case, a user may select the pieces of the spanning regions between sub-images to construct modified sub-images where the left and right most pieces of the sub-images that correspond to those determined by the non-linear path. The user can do this using, for example, image processing software. Alternatively, the image processor 110 can access the stored spanning region image data and construct modified adjacent sub-images, without further user input.

Figure 5:
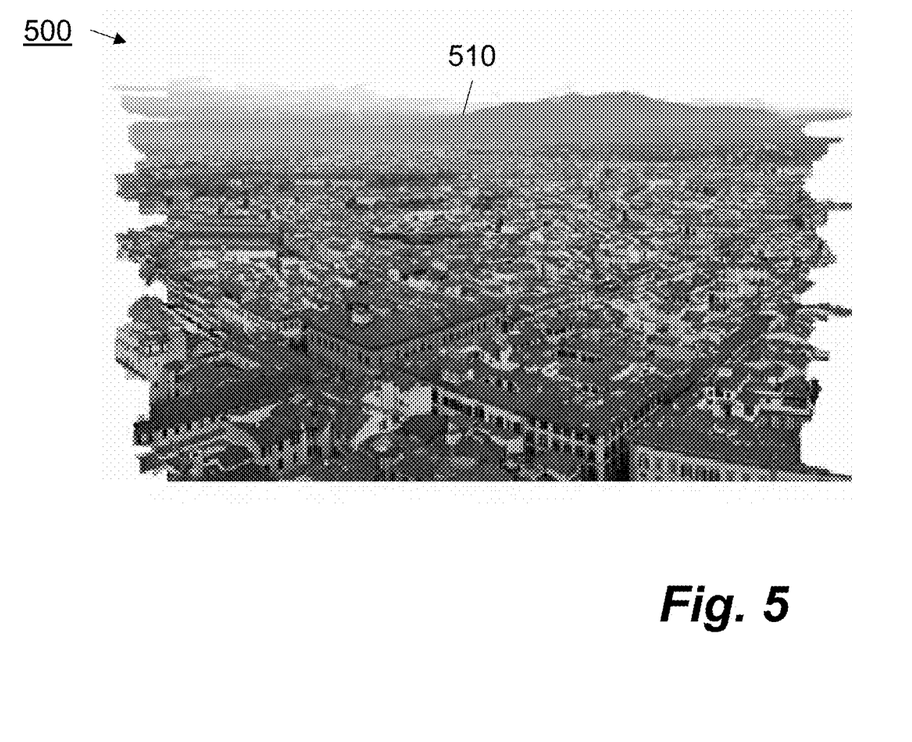
FIG. 5 is a schematic diagram showing a modified sub-image according to an example.

FIG. 5 shows an image 500 according to an example. In FIG. 5, the image 500 is a modified sub-image. The modified sub-image is the resulting image from dividing the spanning regions on either side of the original sub-image from which the modified sub-image 500 is constructed, according to an example. The image 500 may be rendered using the GPU 130 and displayed to a user on the graphics display 180 or stored as image data in the memory 140 of the image processor 110. The user may decide that the modified adjacent sub-images do not disguise the boundaries between the adjacent images sufficiently well for the final printed output of the full image. In such a case, the user may submit a new user input in the spanning region from which the image processor 110 can determine a new non-linear path to generate further modified adjacent sub-images until the printed output is satisfactory.

Figure 6:
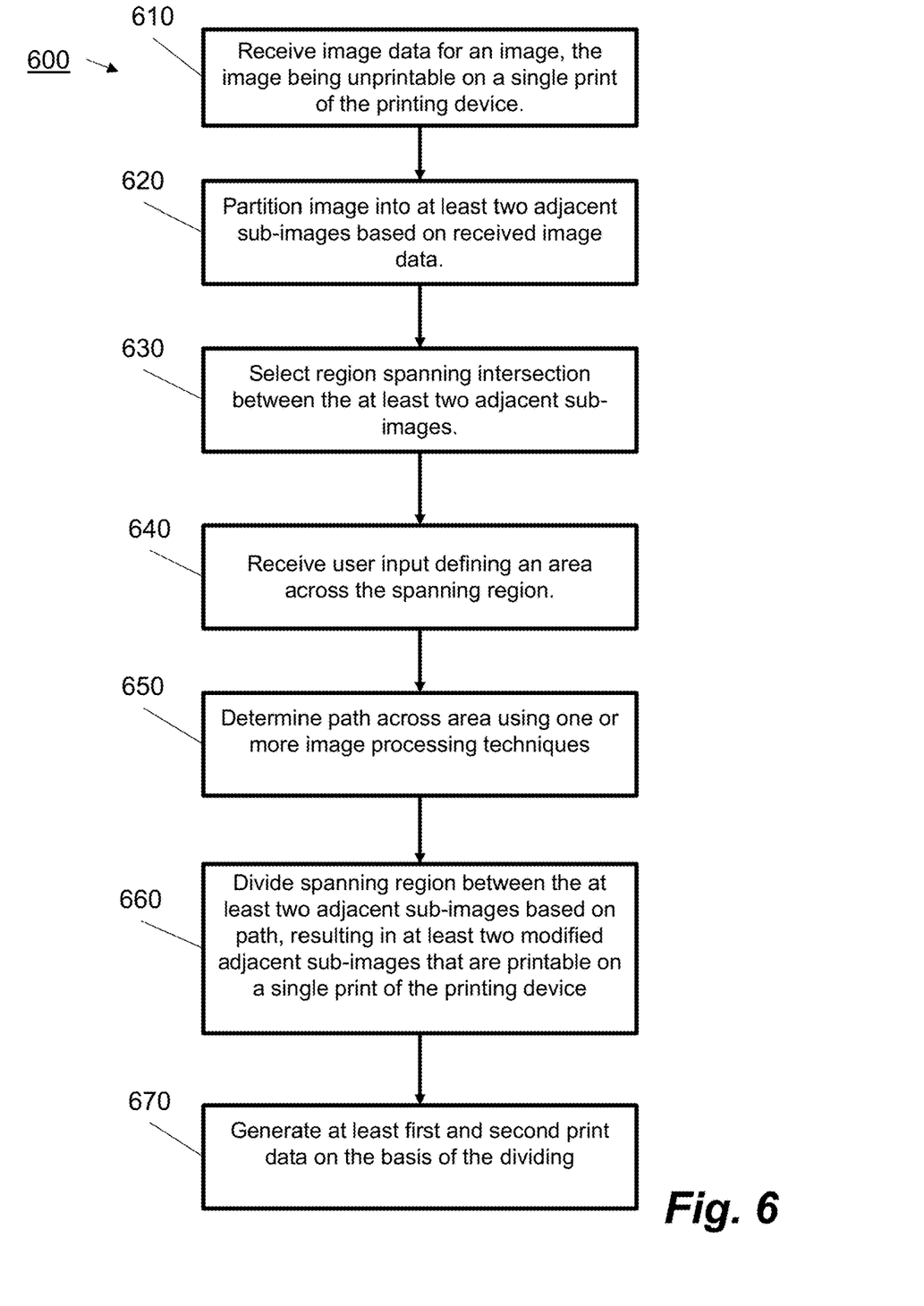
FIG. 6 is a schematic diagram showing a method of generating print data according to an example.

FIG. 6 is a block diagram showing a method 600 of generating print data according to an example. The method 600, which is shown in FIG. 6 may be used in conjunction with the apparatus 100 shown in FIG. 1 to generate print data. At block 610, image data for an image that is unprintable on a single print of a printing device is received. The image data may be received by the image processor 110 of the apparatus 100 shown in FIG. 1. At block 620, the image is partitioned into at least two adjacent sub-images based on the received image data, for example, as shown in FIGS. 2A-2C. At block 630, a region spanning the intersection between the at least two adjacent sub-images is selected. At block 640, a user input is received defining an area across the spanning region. For example, the area may be selected by a user on a GUI or may be received from an external device to the device executing the method 600. At block 650, a path is determined across the area using one or more image processing techniques. At block 660, the spanning region is divided between the at least two adjacent sub-images based on the path determined at block 650, resulting in at least two modified adjacent sub-images that are printable on a single print of the printing device. At block 670, at least first and second print data, operable to cause the printing device to print at least first and second prints, respectively, is generated. Additionally, the sending of print data to a printing device may be followed by block 670.

The methods and systems described herein provide a means for printing an oversized image that is too large to print on a printing device. Printing sub-images of the image based on a naive stitching process, where images are stuck together edge to edge, results in an unsatisfactory and low quality print of the image where the borders between the sub-images can easily be recognized. Due to the human eye's high pattern-recognition capabilities, even narrowly overlapping regions between sub-images in a stitching can easily be distinguished in the final print. The present methods and apparatus addresses this by determining a path across a spanning region in the intersection of adjacent sub-images, and dividing the spanning region on the basis of the determined path. The path is determined using image processing techniques which identify image elements in a way such that the resulting paths between sub-images are hard to detect on visual inspection. This results in higher quality printed output for the over-sized image. The methods and apparatus disclosed herein produce a seamless printed output of an enhanced quality over previous techniques.

Figure 7:
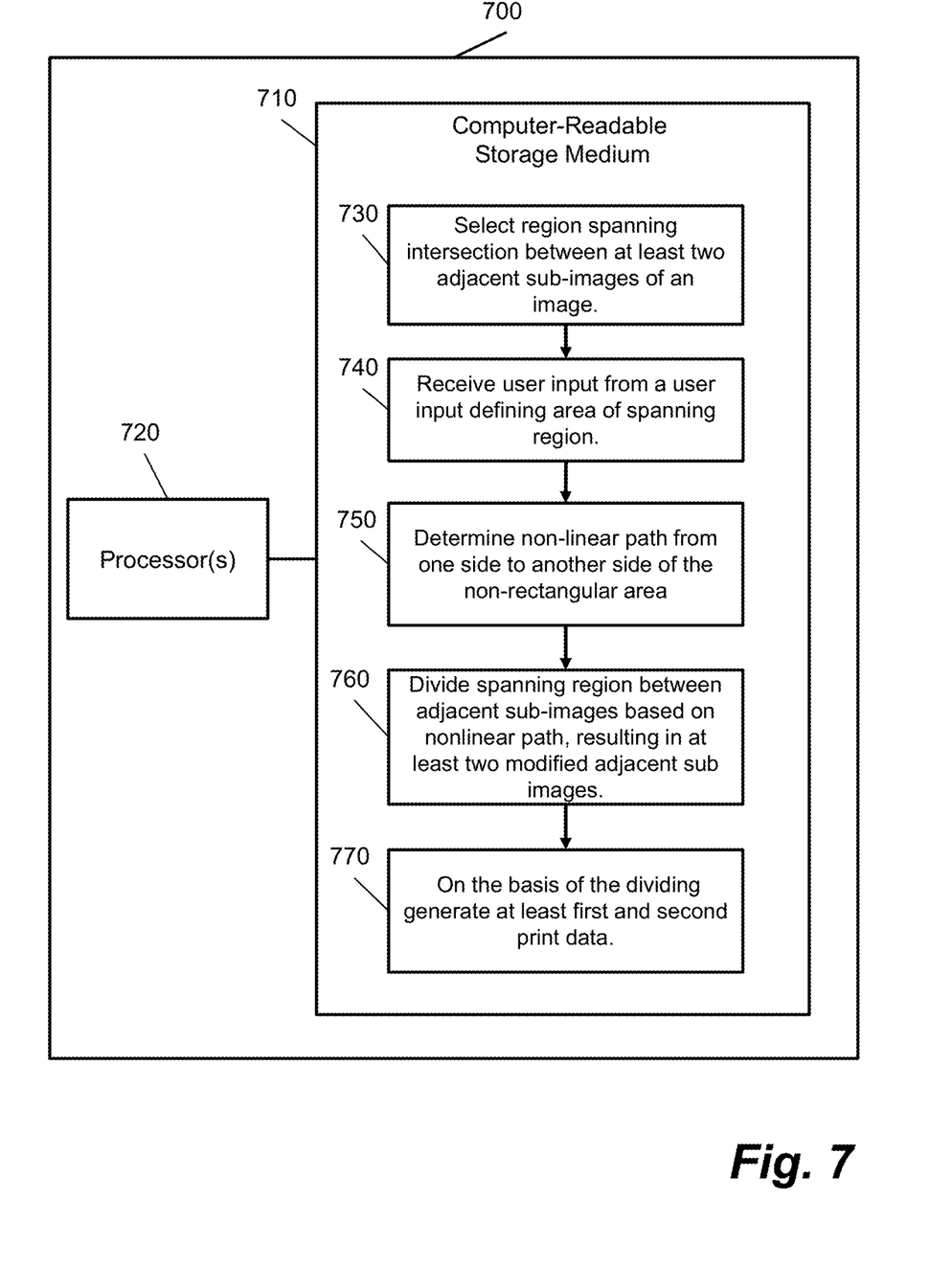
FIG. 7 is a schematic block diagram of a computer system according to an example.

Certain methods and systems as described herein may be implemented by one or more processors that processes program code that is retrieved from a non-transitory storage medium. FIG. 7 shows an example 700 of a device comprising a computer-readable storage medium 710 coupled to at least one processor 720. The computer-readable media 710 can be any media that can contain, store, or maintain programs and data for use by or in connection with an instruction execution system. Computer-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

In FIG. 7, the computer-readable storage medium comprises program code to: select a region spanning an intersection between at least two adjacent sub-images forming an image, wherein the image is unprintable on a printing device 730, receive user input defining an area of the spanning region 740, determine a non-linear path from one side to another side of the area 750, divide the spanning region between the at least two adjacent sub-images based on the non-linear path, resulting in at least two modified adjacent sub-images which are printable on a single print of the printing device 760, and on the basis of the dividing, generate at least first and second print data operable to cause the printing device to print at least first and second prints respectively 770.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A method performed by a system comprising a hardware processor, comprising:
   receiving image data of an image, the image being unprintable in a single print of a printing device;
   partitioning the image into adjacent sub-images based on the received image data;
   selecting a spanning region that spans an intersection between the adjacent sub-images;
   receiving a user input defining an area across the spanning region;
   determining, based on an image attribute in the area, a non-linear path across the area using an image processing technique;
   dividing the spanning region between the adjacent sub-images based on the non-linear path, resulting in respective modified adjacent sub-images that are printable in a single print of the printing device; and
   based on the dividing, generating first and second print data to cause the printing device to print respective first and second prints.

2. The method of claim 1, wherein the partitioning produces the adjacent sub-images that are each printable in a single print of the printing device.

3. The method of claim 1, comprising:
   receiving print configuration data defining a printing parameter of the printing device; and
   determining whether the modified adjacent sub-images are printable by the printing device based on the print configuration data.

4. The method of claim 1, wherein the determining of the non-linear path across the area using the image processing technique comprises identifying, using the image processing technique, elements of image data associated with the area having the image attribute.

5. The method of claim 1, wherein the determining of the non-linear path across the area using the image processing technique comprises identifying, using the image processing technique, elements of image data associated with the area having dissimilar image attributes.

6. The method of claim 1, wherein the determining of the non-linear path across the area using the image processing technique comprises identifying, using the image processing technique, elements of image data associated with the area having dissimilar colors.

7. The method of claim 1, wherein the determining of the non-linear path across the area using the image processing technique comprises identifying, using the image processing technique, elements of image data associated with different objects in the area.

8. The method of claim 1, wherein the determining of the non-linear path across the area using the image processing technique comprises causing a boundary between the modified adjacent sub-images to be invisible.

9. The method of claim 1, wherein the received user input is responsive to a user selection in a visual representation of the spanning region in a graphical user interface.

10. The method of claim 1, comprising printing the respective first and second prints using the printing device, based on the first and second print data.

11. The method of claim 1, wherein the image has a dimension that exceeds a maximum printable dimension of the printing device.

12. A non-transitory computer-readable storage medium storing instructions that, when executed, cause a system to:
    select a spanning region spanning an intersection between adjacent sub-images forming an image, wherein the image is unprintable in a single print of a printing device;
    receive a user input defining an area of the spanning region;
    determine, based on an image attribute in the area, a non-linear path from one side to another side of the area;
    divide the spanning region between the adjacent sub-images based on the non-linear path, resulting in respective modified adjacent sub-images that are each printable in a single print of the printing device; and
    generate first and second print data based on the modified adjacent sub-images to cause the printing device to print respective first and second prints.

13. The non-transitory computer-readable storage medium of claim 12, wherein the instructions when executed cause the system to determine whether the modified adjacent sub-images are printable by the printing device based on print configuration data of the printing device.

14. The non-transitory computer-readable storage medium of claim 12, wherein the instructions when executed cause the system to communicate the first and second print data to the printing device to cause the printing device to print the respective first and second prints.

15. The non-transitory computer-readable storage medium of claim 12, wherein the instructions when executed cause the system to determine the non-linear path based on dissimilar image attributes of adjacent elements identified using an image processing technique in the area.

16. The non-transitory computer-readable storage medium of claim 12, wherein the determining of the non-linear path across the area comprises identifying, using an image processing technique, elements of image data associated with the area having dissimilar colors.

17. The non-transitory computer-readable storage medium of claim 12, wherein the determining of the non-linear path across the area comprises identifying, using an image processing technique, elements of image data associated with different objects in the area.

18. The non-transitory computer-readable storage medium of claim 12, wherein the determining of the non-linear path across the area comprises causing a boundary between the modified adjacent sub-images to be invisible.

19. An apparatus comprising:
   a processor; and
   a non-transitory storage medium storing instructions executable on the processor to:
   select a spanning region that spans an intersection between adjacent sub-images produced based on partitioning an image, wherein the image is unprintable in a single print of a printing device,
   receive a user input defining an area of the spanning region;
   determine, based on an image attribute in the area, a non-linear path from one side to another side of the area;
   divide the spanning region between the adjacent sub-images based on the non-linear path, resulting in respective modified adjacent sub-images that are each printable in a single print of the printing device; and
   generate first and second print data based on the modified adjacent sub-images to cause the printing device to print respective first and second prints.

20. The apparatus of claim 19, wherein the determining of the non-linear path across the area comprises identifying, using an image processing technique, elements of image data associated with different objects in the area.

* * * * *